(No Model.)
U. HASKIN.
FRICTION CLUTCH.
No. 265,496. Patented Oct. 3, 1882.
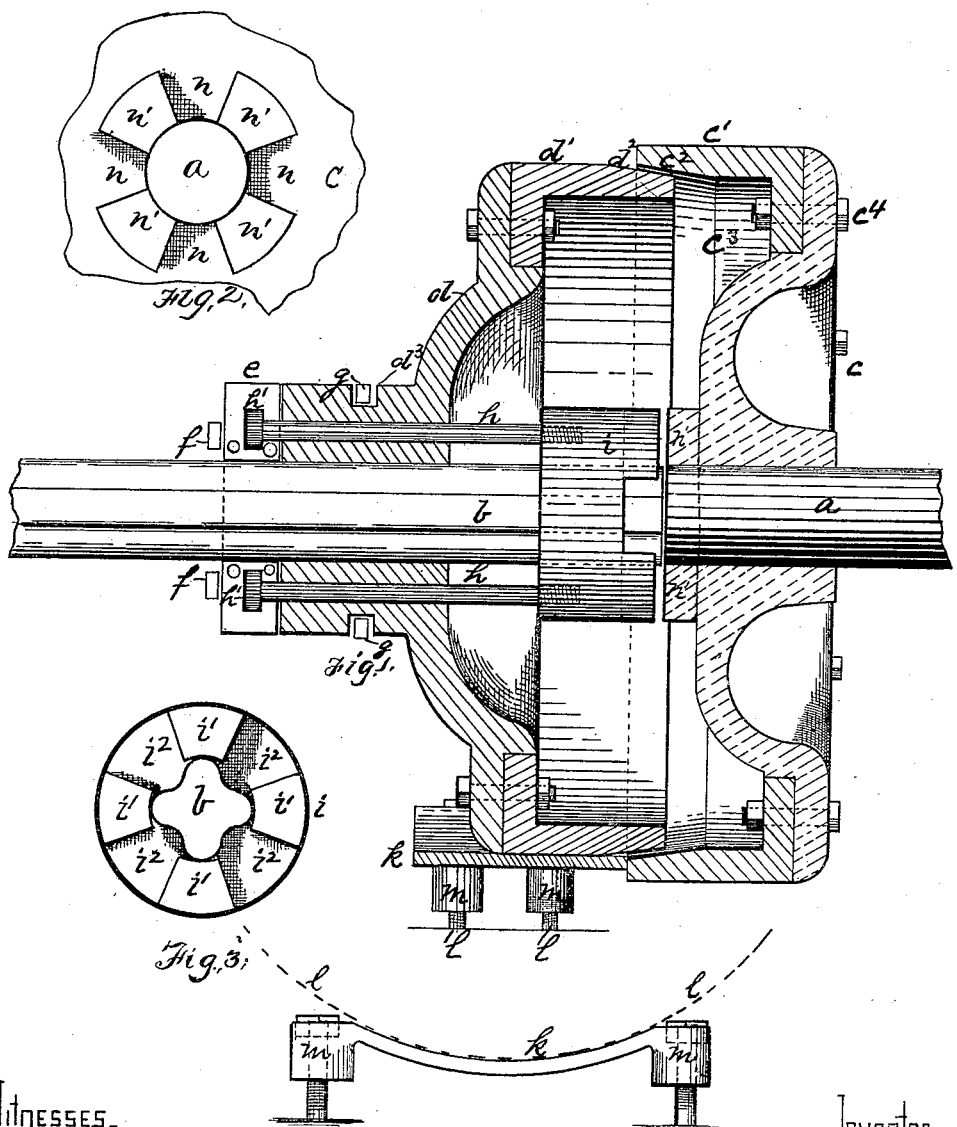
Witnesses
Inventor.
Uri Haskin
by his attys
Bakewell & Kerr

UNITED STATES PATENT OFFICE.

URI HASKIN, OF PITTSBURG, PENNSYLVANIA, ASSIGNOR OF ONE-HALF TO ATLAS WORKS, (LIMITED,) OF SAME PLACE.

FRICTION-CLUTCH.

SPECIFICATION forming part of Letters Patent No. 265,496, dated October 3, 1882.

Application filed November 25, 1881. Renewed September 14, 1882. (No model.)

*To all whom it may concern:*

Be it known that I, URI HASKIN, of Pittsburg, in the county of Allegheny and State of Pennsylvania, have invented a new and useful Improvement in Friction-Clutches; and I do hereby declare the following to be a full, clear, and exact description thereof.

My invention relates to that class of friction-clutches illustrated by my former patent, No. 228,893, of June 15, 1880, in which there is, in combination with an ordinary clutch, a friction-clutch, the said friction-clutch being first thrown into gear for the purpose of establishing a gradual connection between the shafts, and thereby taking off the sudden stripping strain from the teeth of the ordinary gear-clutch.

My present invention consists of an improved construction of such a combined friction and gear clutch.

To enable others skilled in the art to make and use my invention, I will now describe it by reference to the accompanying drawings, in which—

Figure 1 is a longitudinal section, showing the construction of my improved apparatus. Figs. 2 and 3 are end views of the engaging parts of the gear-clutch, and Fig. 4 is a step or shoe upon which the friction-clutch rests.

The two shafts are indicated at $a$ and $b$.

Upon the end of the shaft $a$ is a head, $c$, which is rigidly secured thereto by keys or other means. To this head is secured by bolts $c^4$ a lateral flange-piece, $c'$, the inner surface of which is beveled, as at $c^2$, so as to form a tapered cavity, $c^3$.

On the inner side of the head $c$, and arranged radially around the center of the same, are two or more lugs, $n$, having recesses $n'$ between them for the reception of the projections of the clutch, the said lugs $n$ entering the recesses of the clutch when the latter is thrown into gear.

On the end of the shaft $b$ is a sliding head, $d$, having a flange, $d'$, bolted to it. The diameter of the periphery of the flange $d'$ is less than the diameter of the corresponding part, $c'$, on the head $c$, and its outer surface is beveled, as at $d^2$, so as to give it the shape of a truncated cone. The bevel of the part $d'$ corresponds to the internal bevel of the part $c'$, so that when the sliding head $d$ is thrown forward the cone-piece $d'$ will enter within the conical cavity $c^2$ and the beveled surfaces of the two parts be brought together. This constitutes the friction-clutch portion of my device. The head $d$ is moved backward and forward on the shaft $b$ by means of a bifurcated lever, $g$, of the usual construction, the arms of which fit into the groove $d^3$. To prevent the end of the shaft $b$ sagging under the weight of the head $d$, I rest the latter upon an adjustable shoe or step, $k$, which is of a curved form and mounted on screw-stems $l$ by means of the threaded boxes $m$. The shoe, being adjusted to a proper height with relation to the head $c$, supports the head $d$ in position and prevents the sagging of the shaft $b$.

On the shaft $b$, back of the sliding head $d$, is a sliding collar, $e$, which is connected by headed bolts $h$, passing through the head $d$, with a clutch, $i$, on the end of the shaft $b$. The clutch $i$ slides freely upon the shaft $b$, and is provided with radial projections $i'$ and recesses $i^2$, corresponding with the projections $n$ and recesses $n'$ on the inner surface of the head $c$. The heads $h'$ of the bolts are secured in the collar $e$ in correspondingly-shaped recesses, the collar $e$ being made in two halves, which are bolted together around the shaft $b$ and over the heads of the bolts. The front ends of the bolts $h$ screw into the rear end of the clutch $i$, and are thereby adjustable to fix the relative movements of the head $d$ and clutch $i$. The sliding collar $e$ is operated forward on the shaft $b$ by means of a bifurcated lever, $f$, of the usual construction, which lever has no other control of the collar $e$, and cannot therefore be made to withdraw the positive clutch $i$.

The operation of my improved device is as follows: When it is desired to make the connection between the power and other shafts the head $d$ is thrown forward until its beveled surface $d^2$ comes into contact with the bevel $c^2$ of the head $c$, and as this contact becomes closer the motion of the head $c$ is imparted to the shaft $b$, and then the sliding collar $e$ is thrown forward until the clutch is properly engaged with the projections $n$ upon the inner surface of the head $c$. This requires the separate movement of the head $d$ and collar $e$; but when the clutch is thrown out of gear the head $d$ is moved back and carries before it the collar $e$, and thereby the clutch $i$, thus requiring but one movement in uncoupling. The collar $e$ is thrown forward by a bifurcated lever, $f$, the ends of which bear against the rear side of the collar. This lever being unable to withdraw the collar, and thereby the clutch, this must be done by the retraction of the head $d$. In this way I prevent careless workmen from throwing back the gear-clutch only and leaving the friction-clutch in contact. I have experienced this difficulty, and have had several friction-clutches worn away by this cause.

The flanges $d'$ and $c'$ are separate pieces from their heads and bolted thereto. This simplifies the manufacture and enables them to be changed when worn.

The arrangement of the friction-clutch outside of the gear-clutch enables me to increase the friction-surface to any desired extent, and thereby its power correspondingly, while the efficiency of the gear-clutch remains unimpaired.

The use of the beveled friction-flanges enables me to get a firmer hold with less power than can be obtained with plain friction-surfaces standing at right angles to the shaft and requiring a square thrust upon each other. Making the beveled friction-surfaces on the periphery or similar part of the wheels or heads increases the area of such surfaces and gains power. It is apparent that the externally-beveled flange may be arranged on the stationary head $c$ and the internally-beveled flange on the reciprocating head $d$, if desired, without departing from my invention.

I am aware that a friction clutch and gear-clutch have heretofore been combined and mounted on the same shaft, each provided with a lever by means of which it could be moved both into and out of gear independently, and do not herein claim the same, for the reason that if the lever has positive control over the gear-clutch in both directions there is a constant liability of the operator disconnecting the gear-clutch without at the same time withdrawing the friction-clutch, thus bringing unnecessary wear on the friction-clutch and hastening its destruction.

What I claim as my invention, and desire to secure by Letters Patent, is—

1. In a friction-clutch, the combination of two heads having attachable peripheral flanges provided with beveled friction-surfaces, substantially as and for the purposes described.

2. The combination of the gear-clutch, adjustably connected to its operative collar, and the sliding head mounted on the same shaft between said clutch and collar, substantially as and for the purposes described.

3. The sliding head, in combination with its supporting-shoe, substantially as and for the purposes described.

4. A combined friction and gear clutch having reciprocating friction and gear parts mounted on the same shaft, in combination with a lever adapted to operate the friction-clutch both into and out of gear, and a lever adapted to move the gear-clutch into gear only, whereby the gear-clutch cannot be disconnected independently of the friction-clutch, substantially as and for the purpose specified.

In testimony whereof I have hereunto set my hand.

URI HASKIN.

Witnesses:
J. K. SMITH,
JAMES H. PORTE.